US011907051B1

(12) United States Patent
Zhu et al.

(10) Patent No.: US 11,907,051 B1
(45) Date of Patent: Feb. 20, 2024

(54) CORRECTING INVALID ZERO VALUE FOR DATA MONITORING

(71) Applicant: INTERNATIONAL BUSINESS MACHINES CORPORATION, Armonk, NY (US)

(72) Inventors: Bo Chen Zhu, Xi'an (CN); Cheng Fang Wang, Beijing (CN); Ai Ping Feng, Beijing (CN); Xinzhe Wang, Beijing (CN); Yan Ting Li, Beijing (CN); Hong Yan Gu, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/930,164

(22) Filed: Sep. 7, 2022

(51) Int. Cl.
*G06F 11/07* (2006.01)

(52) U.S. Cl.
CPC ...... *G06F 11/0763* (2013.01); *G06F 11/0709* (2013.01); *G06F 11/073* (2013.01)

(58) Field of Classification Search
CPC . G06F 11/0709; G06F 11/073; G06F 11/0763
See application file for complete search history.

(56) References Cited

U.S. PATENT DOCUMENTS

| 8,166,000 | B2 | 4/2012 | Labrie |
| 8,401,987 | B2 | 3/2013 | Agrawal |
| 9,021,333 | B1* | 4/2015 | Northcott ............. G06F 11/073 |
| | | | 714/766 |
| 10,614,056 | B2 | 4/2020 | Ignatyev |
| 2016/0239532 | A1 | 8/2016 | Gould |
| 2016/0292214 | A1 | 10/2016 | Sengupta |
| 2020/0210401 | A1 | 7/2020 | Swami |

FOREIGN PATENT DOCUMENTS

WO        2019147249 A1    8/2019

* cited by examiner

*Primary Examiner* — Joseph R Kudirka
(74) *Attorney, Agent, or Firm* — Caleb D. Wilkes

(57) ABSTRACT

A method, computer system, and computer program product for data monitoring management are provided. A first invalid zero value candidate from a data stream is received. A memory location for the first invalid zero value candidate is received. At a first time an access connection to the memory location is established. At a second time subsequent to the first time the access connection to the memory location is checked. Based on the checking, a determination is made whether the first invalid zero value candidate contains an invalid zero value.

20 Claims, 8 Drawing Sheets

CORRECTING INVALID ZERO VALUE FOR DATA MONITORING

BACKGROUND

The present invention relates generally to automated monitoring of data streams and for automated techniques for clarifying the meaning of values of the data streams that are being monitored.

SUMMARY

According to one exemplary embodiment, a method for data monitoring management is provided. A first invalid zero value candidate from a data stream is received. A memory location for the first invalid zero value candidate is established. At a first time an access connection to the memory location is checked. At a second time subsequent to the first time the access connection to the memory location is checked. Based on the checking, a determination is made whether the first invalid zero value candidate contains an invalid zero value. A computer system and a computer program product corresponding to the above-described method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
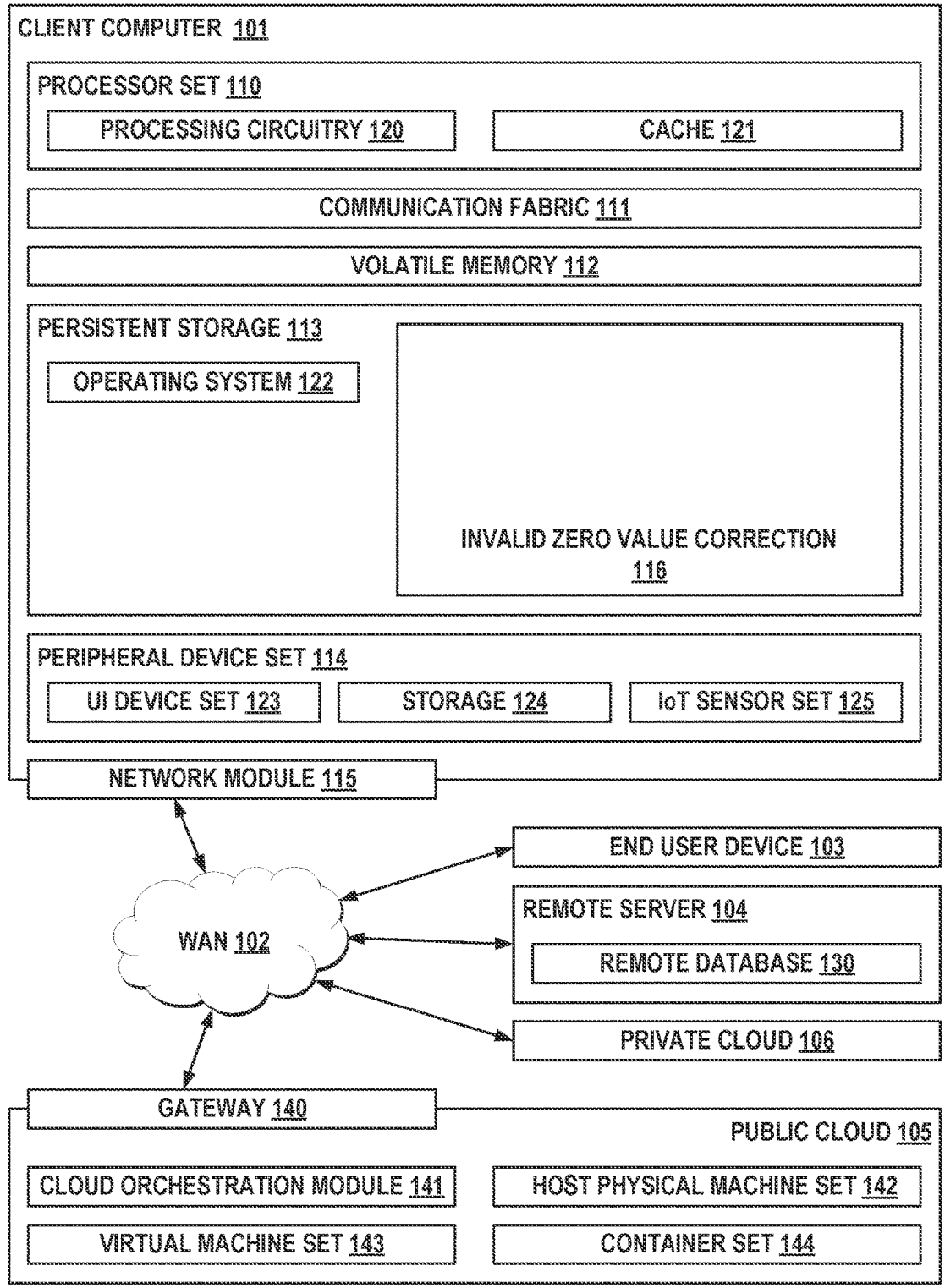
FIG. 1 illustrates a computing environment in which invalid zero data correction according to at least one embodiment may be implemented.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for correcting invalid zero values as a part of data monitoring. Data monitoring may include observing data streams that are generated during performance of various operations. Data monitoring, for example for cloud-related and/or enterprise-related metrics, includes gathering and observing many metrics. Cloud-related data monitoring may evaluate efficiency of communications between nodes of the cloud. It is difficult for an individual person who is monitoring data to quickly become an expert on all of the metrics to be monitored, especially when monitoring for a new computing ecosystem is begun. Professional data monitoring by a data monitoring company may include the implementation of computer programs/software on one or more computers of a customer in order to perform data monitoring for improving computer programs and cloud optimization of the customer. Successful monitoring may require some operations in the customer environment which the customer may not want to allow for various reasons. The customer sometimes wants to restrict access in some instances, but the restriction can interfere with successfully monitoring the data.

In some instances, data monitoring may show that some data metrics are continually zero and/or are filled with zero values. Such continuous zero values may be interpreted as indicating (1) that related performance metrics have not been enabled for the data monitoring program/system or (2) that there may be a bug in the data monitoring program/system. The present embodiments improve automated data monitoring by helping correct invalid zero values in the data streams so that misinterpretation of the zero values can be avoided. The present embodiments help improve data monitoring that occurs in an automated manner. The present embodiments also help improve the generation of data reports by providing clearer information that is less likely to be misinterpreted.

In some instances, an automated data monitoring program will initialize a default value from a metric from a data stream with a zero value, even if no value has been entered and/or recorded yet for this metric. The initialization may see a null value or some other value, e.g., FF, and replace this initial value with a "zero" for helping to provide and interpret data. This zero may, however, as described above lead to misinterpretation of the data. The present embodiments use memory access preemption to determine whether zeroes in a data monitoring report are true zero values for the metric or indicate that no values have yet been received/measured/determined for this metric. The present embodiments include the creation and monitoring of a data access bridge to a memory location for the storage of metric values. This data access bridge to this memory location is supplemental to any access that the main customer programs have for writing and/or reading from this memory location.

The present embodiments interpret the maintaining of this data access bridge by the supplemental data monitoring program as an indication that no values are being captured and/or recorded for this metric by the main customer programs. The present embodiments interpret the lack of value capture and/or recordation as indicating that zeroes for this metric in a data report are not true zeroes and instead refer to a metric for which no information is being captured.

The present embodiments interpret the cessation of this data access bridge from the supplemental data monitoring program as an indication that the main customer programs are usurping access to this memory location by writing and/or reading values to this memory location. The present embodiments interpret the accessing of this memory location by the main customer programs as indicating that zeroes for this metric in a data report are true zeroes that do not need correction from the data monitoring program.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as invalid zero value correction 116 that is part of a data monitoring program. The data monitoring program may be referred to as an agent because this program is software that performs work for the data monitoring team. A data monitoring computer program may be newly designed to include the invalid zero value correction 116, or the invalid zero value correction 116 may be a plugin feature that is added onto existing, e.g., already-installed, data monitoring software in the client computer 101. In addition to invalid zero value correction 116 and the data monitoring program, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and invalid zero value correction 116, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in invalid zero value correction 116 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in invalid zero value correction 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images," A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that, the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
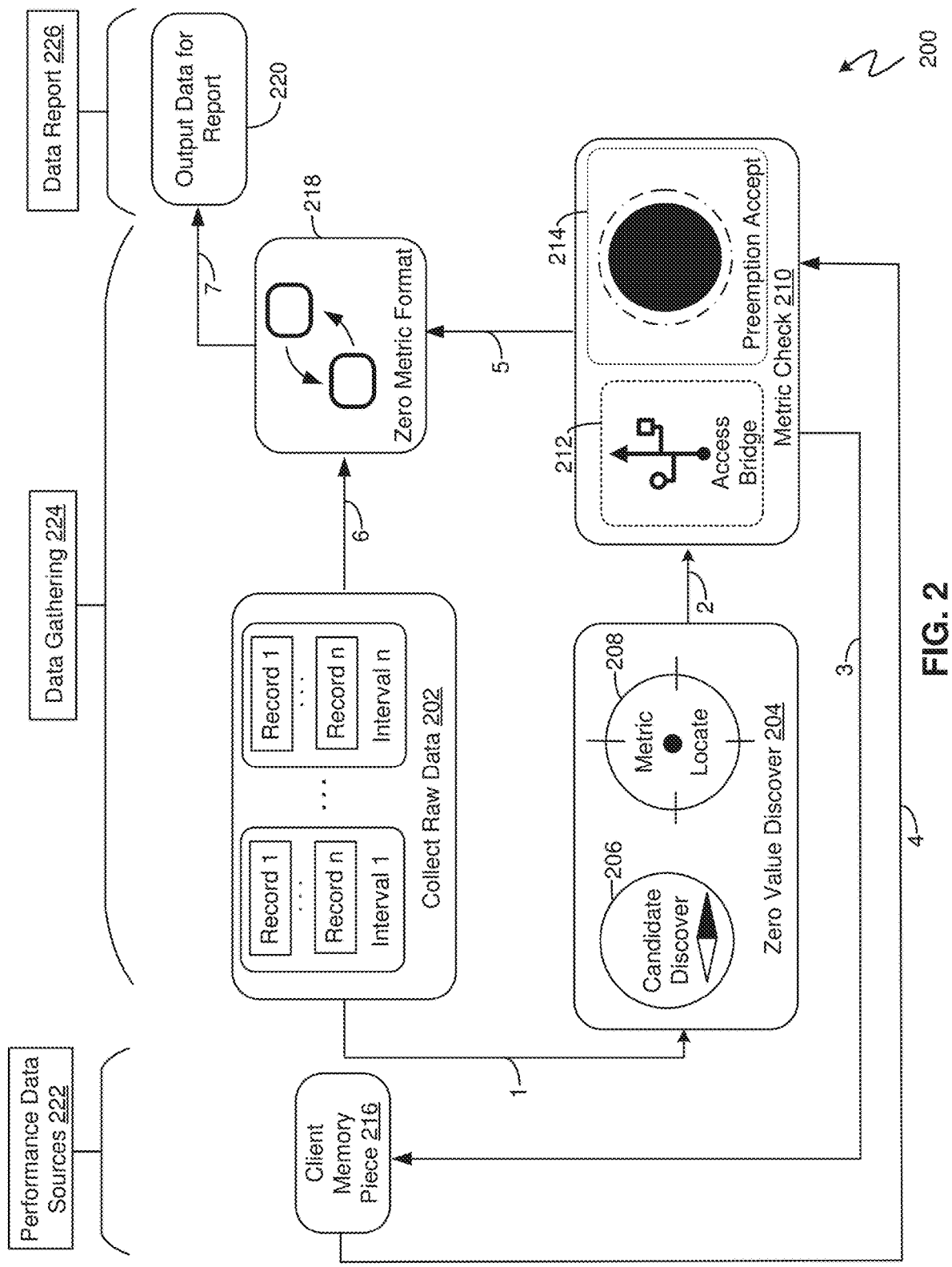
FIG. 2 illustrates a pipeline for invalid zero data correction as a part of data monitoring according to at least one embodiment.

FIG. 2 illustrates a first pipeline 200 for performing invalid zero value correction 116 as a part of data monitoring according to at least one embodiment. The first pipeline 200 may involve the invalid zero value correction 116 that is depicted in FIG. 1. The first pipeline 200 may include the monitoring of data that is/was utilized, received, and/or generated by the client computer 101. In some instances, a customer desires to have their computing systems monitored and evaluated. The customer or another entity may receive a data monitoring program which includes the invalid zero value correction 116. This data monitoring program may be received via the network module 115 of the client computer 101 and stored in the persistent storage 113 within the client computer 101. The data monitoring program and the program for the invalid zero value correction 116 may have their own private memory space allocated from amongst the persistent storage 113 of the client computer 101. In some instances as will be explained subsequently, the program for the invalid zero value correction 116 also accesses other memory storage space within the persistent storage 113 that is used and accessed as part of the customer/user running their own operation programs using the client computer 101.

Figure 3:
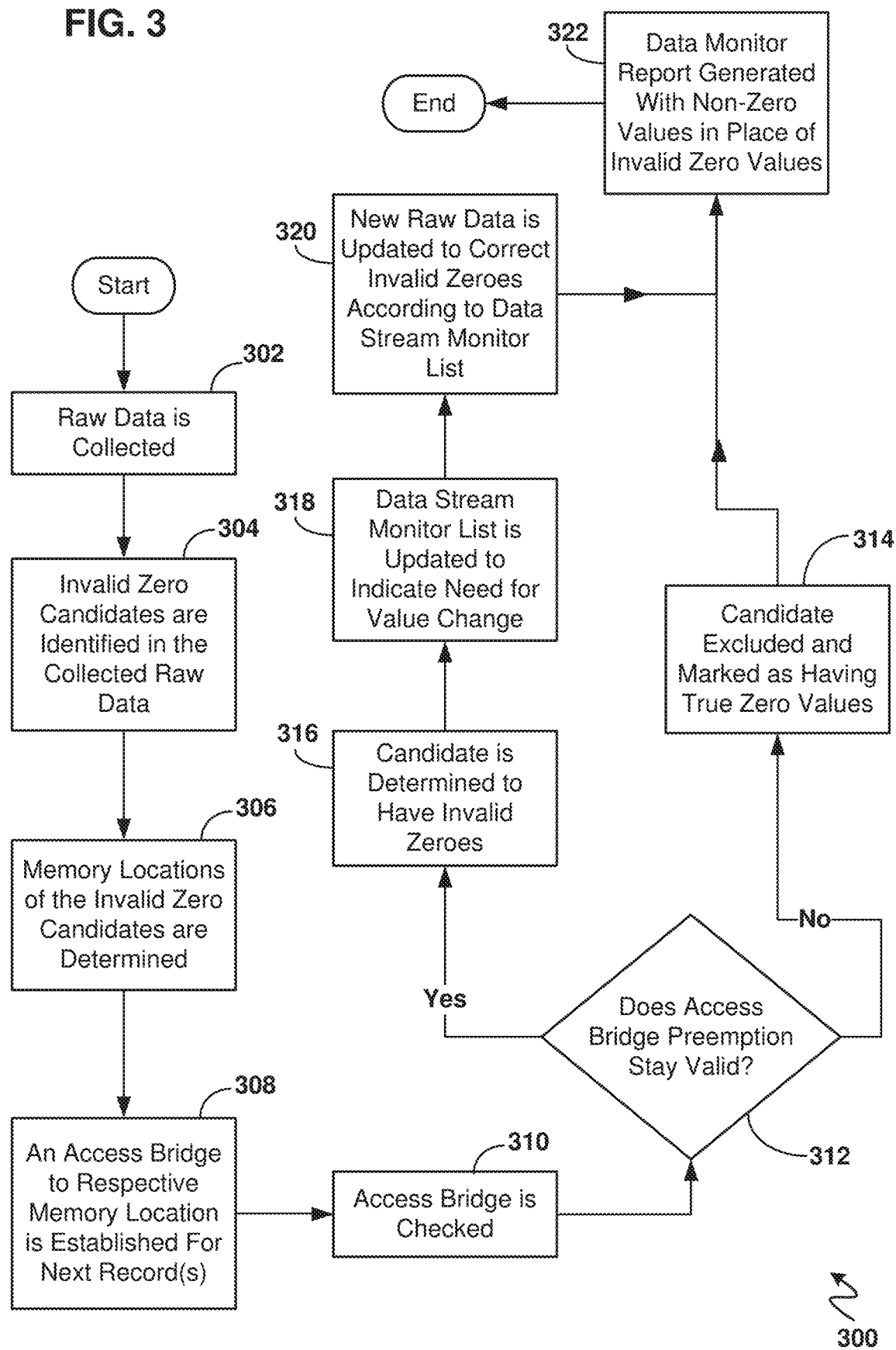
FIG. 3 illustrates an operational flowchart illustrating an invalid zero data correction process according to at least one embodiment.

The first pipeline 200 for performing invalid zero value correction 116 that is depicted in FIG. 2 will also be described in conjunction with the invalid zero data correction process 300 that is depicted in FIG. 3. In other words, FIG. 3 depicts with an operational flowchart a similar or the same process that is depicted in a development pipeline in FIG. 2. The first pipeline 200 is divided into three segments—performance data sources segment 222, data gathering segment 224, and data report segment 226. The various steps and stages of the first pipeline 200 are grouped into one of these three segments. The performance data sources segment 222 incudes the client memory piece 216. The data gathering segment 224 includes the stages 202, 204, 210, and 218. The data report segment 226 includes the stage 220.

In the first pipeline 200, in stage 202 raw data is collected. This raw data may be from data streams that are being monitored. The data streams may be generated via one or more programs being operated by a client, e.g., at the client computer 101 that is depicted in FIG. 1. The client computer 101 may receive data from other computers in a network of the client and/or may perform operations and/or calculations for client programs which generate the raw data. The invalid zero value correction 116 on the client computer 101 may perform this stage 202. Stage 202 overlaps with the step 302 of the invalid zero data correction process 300 depicted in FIG. 3. FIG. 2 depicts that the raw data may be collected in various intervals, e.g., in time intervals, e.g., in intervals 1 to n. Within each interval, multiple records from 1 to n may be collected. The collection of raw data records may include printing performance data records into some place in the memory, e.g., to portions of memory allocated to the data monitoring program.

In a transition 1 of the first pipeline 200, the raw data that is collected in stage 202 is passed to a stage 204 for performing zero value discover. The stage 204 may be performed via one or more modules of the program that performs the invalid zero value correction 116 in client computer 101.

Figure 4:
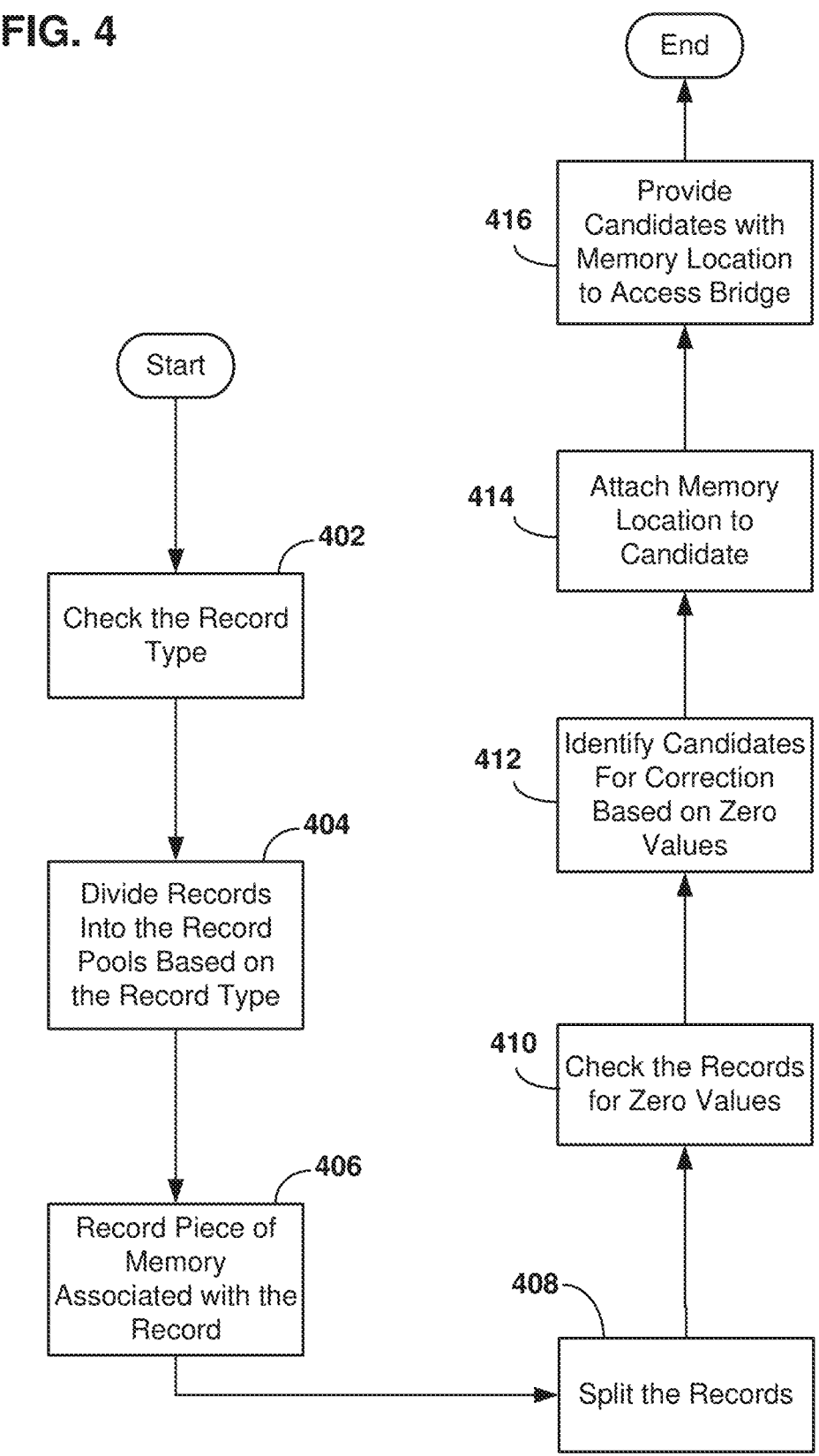
FIG. 4 illustrates another operational flowchart illustrating an invalid zero candidate identifying process according to at least one embodiment and which is part of the invalid zero data correction process depicted in FIG. 3.
Figure 5:
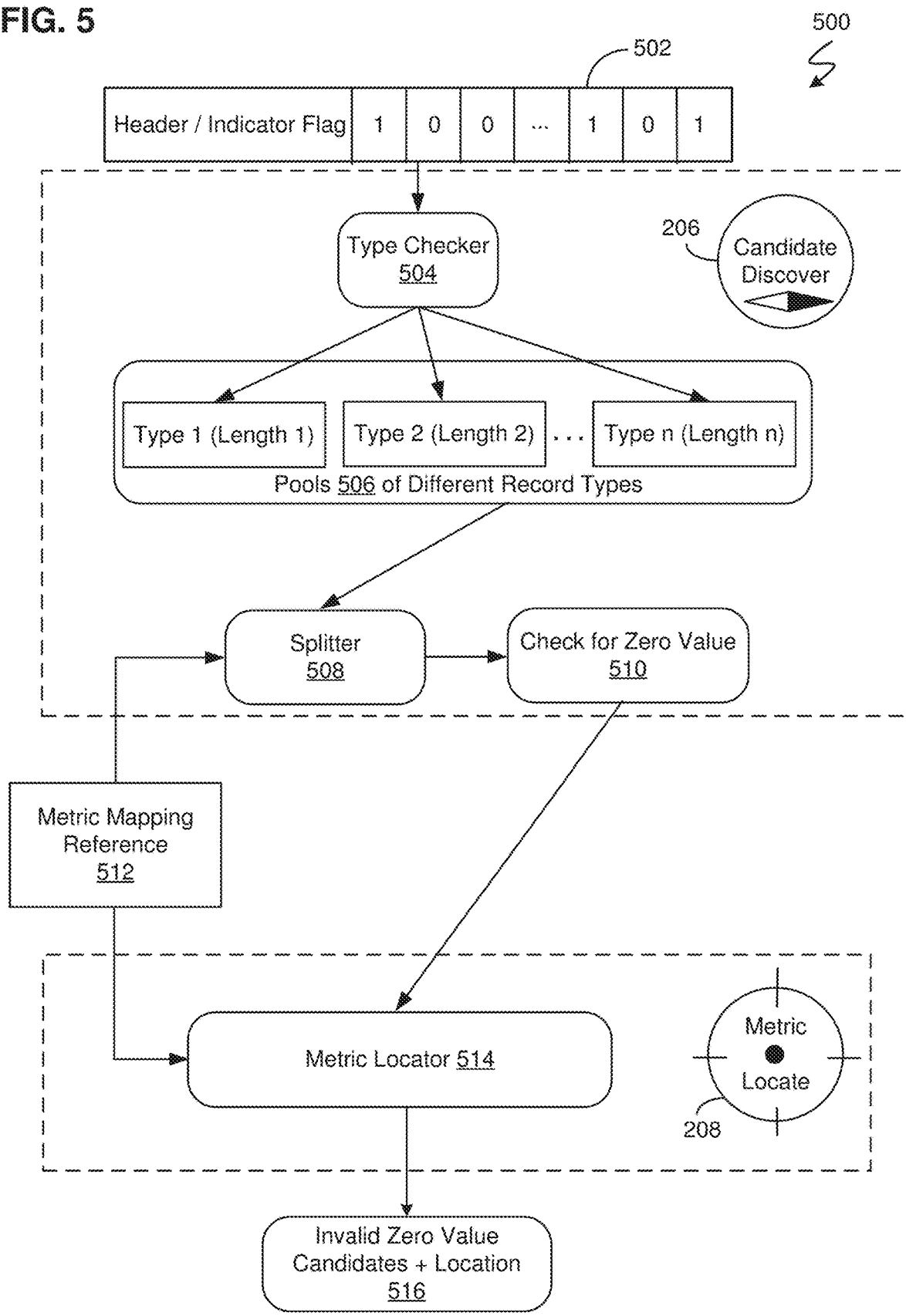
FIG. 5 illustrates a pipeline for an invalid zero candidate identifying process according to at least one embodiment and which corresponds to the process depicted in FIG. 4.

In the first pipeline 200, stage 204 for zero value discover includes two substages—(1) substage 206 for candidate discover and (2) substage 208 for metric locate. FIG. 4 illustrates an identification process 400 which illustrates steps associated with the stage 204. FIG. 5 depicts a second pipeline 500 which provides details for the stage 204 and the substages 206 and 208. The identification process 400 shown in FIG. 4 overlaps with the second pipeline 500, e.g., with the pipeline shown in FIG. 5. Thus, the identification process 400 is subsequently described with cross-reference to the second pipeline 500, and the second pipeline 500 is subsequently described with cross-reference to the identification process 400.

For substage 206, record candidates are identified from the raw data and records that were collected in stage 202. The candidates are identified by finding those records which contain continual zero values. The invalid zero value correction 116 may access the processing circuitry 120 in order to read the raw data and identify records that include all zero values. The processing circuitry 120 may include a comparator which may read and compare the data to zero value to recognize the appropriate record values. Other records amongst the collected raw data records have non-zero numerical values and, therefore, may be discarded and identified as being non-candidates for the invalid zero value search. Separation of the raw records into various record types may occur as part of the substage 206. Substage 206 corresponds to step 304 of the invalid zero value correction process 300.

For substage 208, for those data records that in substage 206 are identified as being candidates for the invalid zero value search, namely for those data records which contain values that are all zero, memory locations for storing those raw data values are identified. These memory locations may be at locations in the persistent storage 113 and/or in the cache 121. Substage 208 corresponds to step 306 of the invalid zero value correction process 300. The memory location may include an address for a starting bit of a particular record.

In a transmission 2 of the first pipeline 200, the invalid zero value candidates along with their respective locations in memory raw data that were determined in the stage 204 are passed to the stage 210 for performing a metric check. The stage 210 may be performed via one or more modules of the program that performs the invalid zero value correction 116 in client computer 101.

Figure 7A:
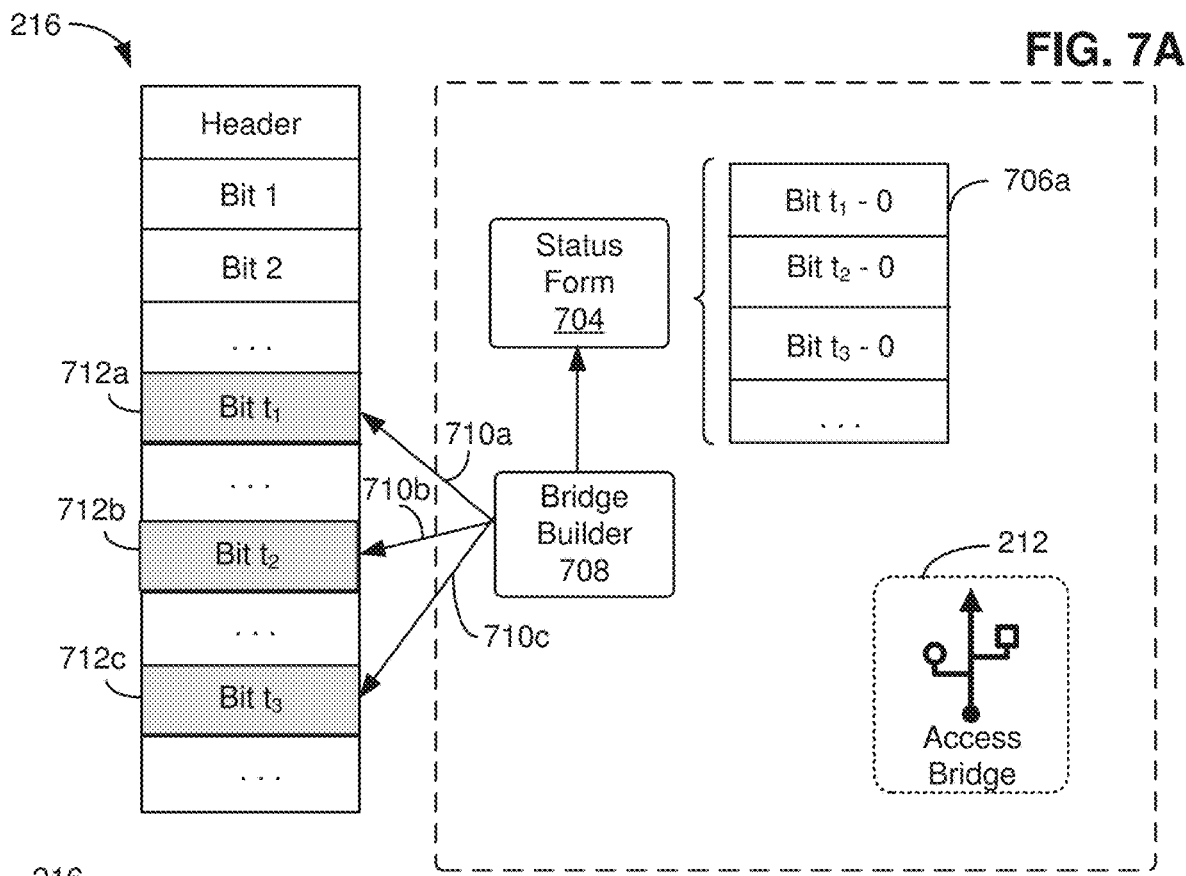
FIG. 7A illustrates aspects of establishing preemption access in accordance with at least one embodiment and as part of the invalid zero correction process depicted in FIG. 3 and as part of the pipeline of FIG. 2.
Figure 7B:
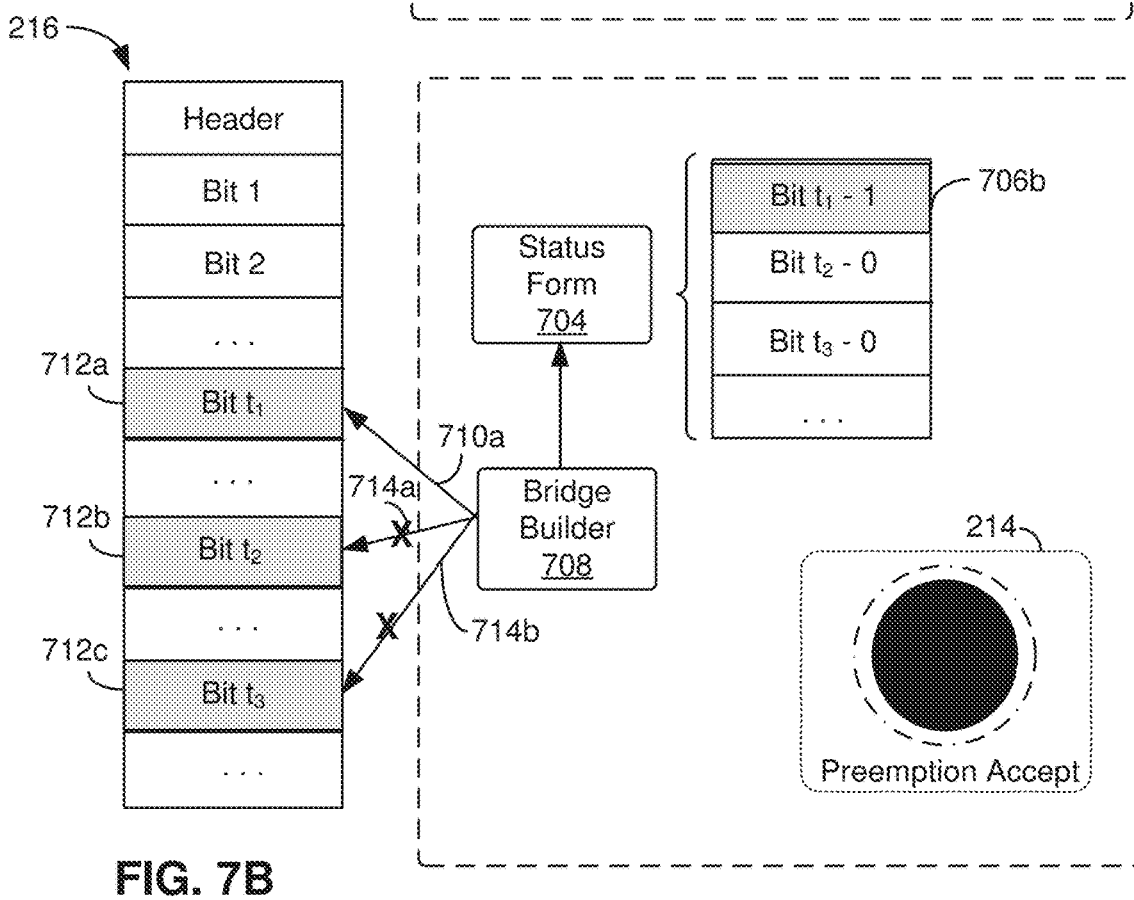
FIG. 7B illustrates aspects for checking preemption access in accordance with at least one embodiment and at a time subsequent to the establishing depicted in FIG. 7A.

Further in the first pipeline 200, stage 210 for the metric check includes two substages—(1) substage 212 for building the access bridge and (2) substage 214 for accepting the preemption. FIG. 7A illustrates aspects of the substage 212 for building the access bridge. FIG. 7B illustrates aspects of the substage 214 for accepting the preemption.

For substage 212 for building the access bridge, a status form 704 for the candidates is generated. The status form 704 may be a binary string and is used to track a connection bridge. An access bridge module within the program for invalid zero value correction 116 generates an access connection to the respective memory location for each candidate. The respective memory location will be in the client memory piece 216. Thus, the substage 212 includes one or more transmissions 3 to the client memory piece 216 in order to evaluate the access connection. The respective access connection may be long but in a lowest priority or security key. Implementing the access connection in the lowest priority or security key allows the client programs to easily seize the memory location for their own write access. Substage 212 overlaps with step 308 of the invalid zero value correction process 300. Step 308 incudes establishing an access bridge to a respective memory location for the next record(s).

For substage 214 for the preemption accept, one or more return transmissions 4 from the client memory piece 216 are sent to the program for the invalid zero value correction 116. These one or more return transmissions 4 indicate whether the access connection from substage 212 is maintained, e.g., is alive. The access connection is broken if the client programs have seized the memory location for write access. Based on the information in the one or more return transmissions 4, the status form 704 will be updated. Substage 214 overlaps with steps 310, 312, 316, and 314 of the invalid zero value correction process 300 and in some embodiments with step 318 of the invalid zero value correction process 300. Step 310 includes checking the access bridge. This check may occur one or multiple times. Step 312 includes a determination as to whether the access bridge preemption stayed valid. For an affirmative finding in step 312 that the access bridge preemption stayed valid, step 316 is performed by determining that the candidate has invalid zeroes. Step 318 includes updating a data stream monitor list to indicate a need for a value change. Step 318 may be performed in the stage 210 or in the stage 218. For a negative finding in step 312, namely that the access bridge preemption was broken, step 314 is performed by excluding the candidate and marking this record as having true zero values.

For those records in the stage 210 that are determined as having invalid zero values, information regarding these records is passed in transition 5 to the stage 218 for performing a zero metric format. In some instances, a data stream monitor list may be transmitted in transition 5.

Figure 8:
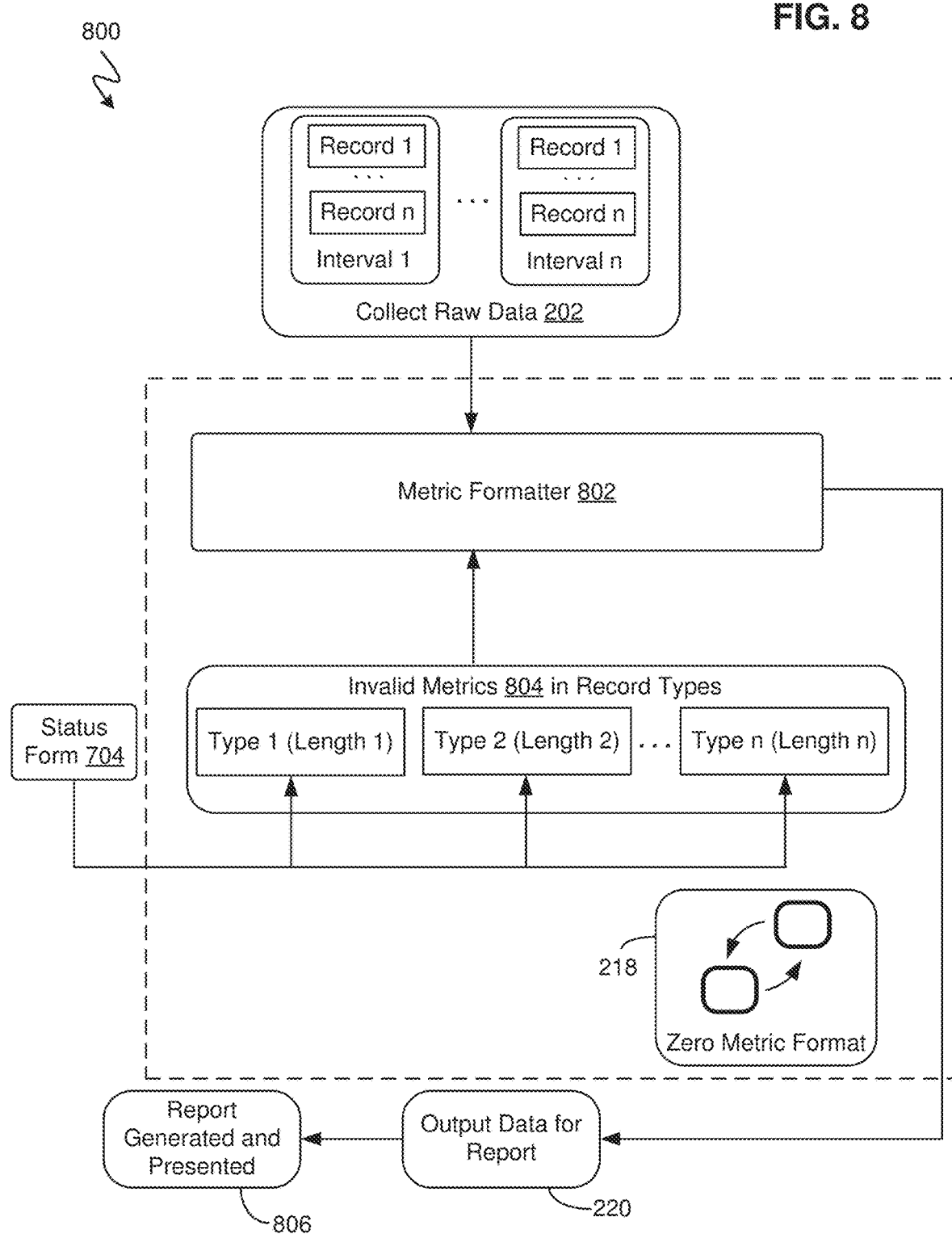
FIG. 8 illustrates another pipeline for correcting invalid zero values for data reports in accordance with at least one embodiment.

Further in the first pipeline 200, stage 218 for the zero metric format includes updating new entries for the respective data streams to correct invalid zero values. Stage 218 includes the intersection of traditional data gathering for data monitoring and the identification and verification of invalid zero values that occurred earlier in the first pipeline 200. The third pipeline 800 that is depicted in FIG. 8 provides details about the stage 218. Stage 218 overlaps with step 320 of the invalid zero value correction process 300 depicted in FIG. 3. In step 320, new raw data is updated to correct invalid zeroes according to the data stream monitor list.

After the invalid zero values are corrected in stage 218, a transmission 7 to stage 220 occurs in the first pipeline 200.

Further in the first pipeline 200, stage 220 is the output of data for a report. The report will include the data that was corrected in the earlier parts of the first pipeline 200. The third pipeline 800 that is depicted in FIG. 8 also provides some details about the stage 220. The substages 818 and 820 in the third pipeline 800 that is depicted in FIG. 8 may be part of the stage 220. Stage 220 may include overlap with step 322 of the invalid zero value correction process 300 that is depicted in FIG. 3. In step 322, a data monitor report with non-zero values in place of invalid zero values is generated. The corrected non-zero values may include non-numerical values in order to further avoid misinterpretation of the data. In some instances, the corrected non-zero values may be or include null values. The data monitor report may be generated and presented as a part of or after stage 220.

FIG. 3 illustrates an operational flowchart illustrating an invalid zero data correction process 300 according to at least one embodiment. The invalid zero data correction process 300 may, according to at least one embodiment, be performed using the program for invalid zero value correction 116 at the client computer 101. Various modules, processing techniques, and persistent or temporary data storage may be implemented when the invalid zero data correction process 300 is performed.

In a step 302 of the invalid zero value correction process 300, raw data is collected. This raw data may be from data streams that are being monitored. The data streams may be generated via one or more programs being operated by a client, e.g., at the client computer 101 that is depicted in FIG. 1. The client computer 101 may receive data from other computers in a network of the client and/or may perform operations and/or calculations for client programs which generate the raw data. The invalid zero value correction 116 on the client computer 101 may perform this step 302 or may be involved in a receiving aspect of the step 302. Stage 202 of the first pipeline 200 depicted in FIG. 2 overlaps with the step 302. Stage 202 in FIG. 2 depicts that the raw data may be collected in various intervals, e.g., in time intervals, e.g., in intervals 1 to n. Within each interval, multiple records from 1 to n may be collected.

In a step 304 of the invalid zero value correction process 300, invalid zero candidates are identified in the collected raw data. The program for invalid zero value correction 116 may access the processing circuitry 120 in order to read the raw data and identify records that include all zero values. The processing circuitry 120 may include a comparator which may read and compare the data to a zero value to recognize the appropriate record values. Records from the raw data and with non-zero numerical values may be discarded and identified as being non-candidates for the invalid zero value search. The identification of step 304 may include separation of the raw records into various record types. Substage 206 of the first pipeline 200 depicted in FIG. 2 corresponds to step 304 of the invalid zero value correction process 300. The second pipeline 500 depicted in FIG. 5 and the invalid zero candidate identifying process 400 depicted in FIG. 4 provide more details about the performance of step 304. As a first part of step 304, a first bit for this record or record section may be read to see if the first bit is a zero value. If the first bit is not a zero value, in at least some embodiments this record or record section may be excluded as not being relevant to the invalid zero value correction process. The length of the metric may be used by the reader/comparator because the reader/comparator knows how many bits to read and check to see if they each contain a zero value.

In a step 306 of the invalid zero value correction process 300, memory locations of the invalid zero candidates are determined. These invalid zero candidates may be those that are identified in step 304. For those data records that in step 304 are identified as being candidates for the invalid zero value search, namely which contain values that are all zero, memory locations for storing those raw data values are identified. These memory locations may be at locations in the persistent storage 113 and/or in the cache 121. Substage 208 of the first pipeline 200 depicted in FIG. 2 and described previously corresponds to step 306 of the invalid zero value correction process 300. The second pipeline 500 depicted in FIG. 5 and the invalid zero candidate identifying process 400 depicted in FIG. 4 provide more details about the performance of step 306.

In a step 308 of the invalid zero value correction process 300, an access bridge to respective memory locations of the invalid zero candidates is established for the next record(s). These invalid zero candidates are or include those that were identified in step 304 and whose memory locations were identified in step 306. For building the access bridge, a status form 704 (depicted in FIGS. 7A and 7B) for the candidates may be generated to track the status of the access bridge. The status form 704 is used to track the access bridge/connection bridge. An access bridge module within the program for invalid zero value correction 116 generates an access connection to the respective memory location for each candidate. The respective memory location will be in the client memory piece 216 which may be in the persistent storage 113 and/or in the cache 121 of the client computer 101. A respective access bridge may be generated for each of the candidates. The respective access connection may be long but in a lowest priority or security key. The long connection means that there may be no expiration time and/or time out for the access connection. Implementing the access connection in the lowest priority or security key allows the client programs to easily seize the memory location for their own write access. Substage 212 of the first pipeline 200 depicted in FIG. 2 overlaps with step 308 of the invalid zero value correction process 300.

Figure 6A:
FIG. 6A illustrates a series of data records with fixed lengths according to one embodiment.
Figure 6B:
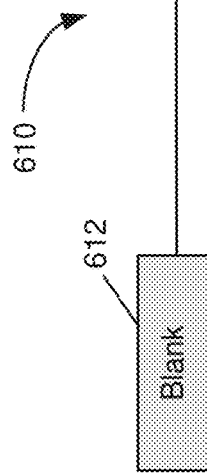
FIG. 6B illustrates a series of data records with dynamic lengths according to another embodiment.
Figure 6C:
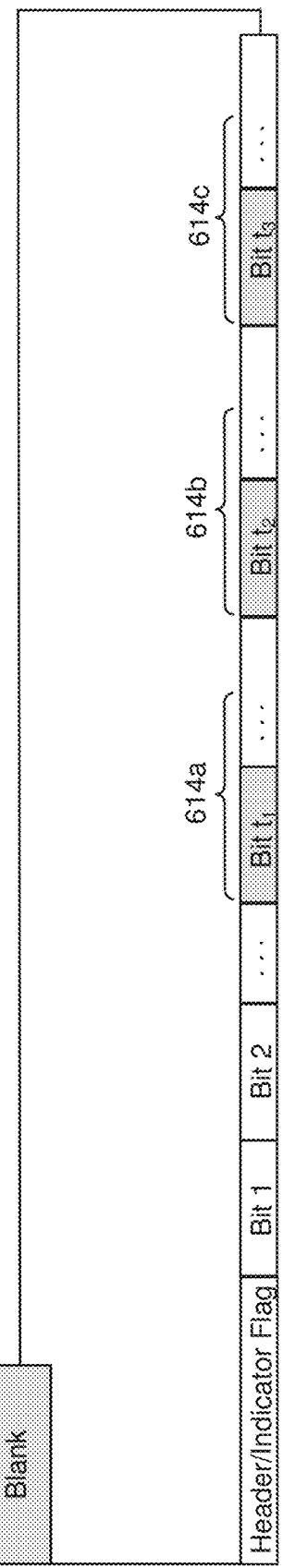
FIG. 6C illustrates the marking of invalid zero value candidates and their memory locations according to at least one embodiment.

FIGS. 6A, 6B, and 6C which are discussed subsequently also provide details about some features that are part of finding the next record(s) in at least some embodiments. Therefore, FIGS. 6A, 6B, and 6C show details about step 308, because the next record(s) must be located in order to establish an access bridge for these next record(s).

In a step 310 of the invalid zero value correction process 300, the access bridge is checked. The access bridge may refer to each of those access bridges that were established in step 308. In some instances, the check may occur once for one, some, or all of the access bridges or multiple times for one, some, or all of the access bridges. The access bridge check may refer to checking the preemption, because the access bridge is also referred to as a preemption. The check may include a transmission to the memory location in the client memory and a return transmission that is received in response to the first transmission. Each return transmission may indicate whether or not the memory location was accessible. The step 310 flows into the determination of step 312. Step 310 has some overlap with substage 214 of the first pipeline 200 depicted in FIG. 2.

In a step 312 of the invalid zero value correction process 300, a determination is made whether the access bridge preemption stays valid. For an affirmative finding in step 312 that the access bridge preemption stayed valid, step 316 is performed by determining that the candidate has invalid zeroes. For a negative finding in step 312, namely that the access bridge preemption was broken, step 314 is performed by excluding the candidate and marking this record as having true zero values.

When the memory location was accessible as indicated by the response to a transmission to the respective memory location, the access bridge is still valid/established. This maintaining of the access bridge indicates that the client operations have not been writing and/or updating this memory location. The preemption that was built in for the data monitor program to preempt the programs of the client from taking access to this memory location is still being accepted. A lack of any client activity to this memory location indicates that values at this location are not being tracked and that the provided zero values must be invalid. These provided zero values were program-generated substitutes for otherwise uninitialized values. When the memory location is inaccessible to the program for invalid zero value correction 116, the access connection is broken because the client programs have seized the memory location for write access. Thus, the client activity is interpreted as indicating that zero values are correct for the respective metric. These zero values are not generated due to program initialization from a null value, but instead represent that zero is a correct measurement for this particular metric. Step 312 has some overlap with substage 214 of the first pipeline 200 depicted in FIG. 2.

In a step 314 of the invalid zero value correction process 300, the candidate is excluded and marked as having true zero values. Step 314 is performed in response to a negative determination in step 312. Within the invalid zero value correction process 300, step 314 is part of a branch that split off at the determination of step 312. This branch is considered the negative branch in which correcting of invalid zero values was unnecessary because the zero values were determined to be true zero values. FIGS. 7A and 7B described below provide an example of two candidates being excluded because these two candidates are found to have true zero values. The respective access bridges for the bits $t_2$ and $t_3$ were each broken. The marking of step 314 may in some embodiments include a lack of any change for an indication of a form. This lack of change would contrast to changes in the indication for those bits for which their access bridge was maintained. FIG. 7B shows an example of no changes being made to the status form 704 for entries for the bits $t_2$ and $t_3$. These lack of changes are an embodiment representing the marking for step 314, because these lack of changes contrast with the changed indication for the entry for bit $t_1$ in the status entry form 704. Step 314 has some overlap with substage 214 of the first pipeline 200 depicted in FIG. 2.

In a step 316 of the invalid zero value correction process 300, the candidate is determined to have invalid zero values. Within the invalid zero value correction process 300, step 316 is part of a branch that split off at the determination of step 312. This branch is considered the affirmative branch and incorporates correcting of invalid zero values. Step 316 is in the affirmative branch along with steps 318 and 320.

When the memory location was accessible as indicated by a response to a transmission to the respective memory location, the access bridge is still valid/established. This maintaining of the access bridge indicates that the client operations have not been writing and/or updating this memory location. The preemption that was built in for the data monitor program to preempt the programs of the client from taking access to this memory location is still being accepted. A lack of any client activity to this memory location indicates that values for this location are not being tracked and that the provided zero values are invalid. These provided zero values were program-generated substitutes for otherwise uninitialized values. Step 316 has some overlap with substage 214 of the first pipeline 200 depicted in FIG. 2.

In a step 318 of the invalid zero value correction process 300, a data stream monitor list is updated to indicate a need for a value change. Within the invalid zero value correction process 300, step 318 is part of a branch that split off at the determination of step 312. This branch is considered the affirmative branch and incorporates correcting of invalid zero values. Step 318 is in the affirmative branch along with steps 316 and 320. The data stream monitor list may be updated as part of the stage 210 for the metric check or as part of the stage 218 for the zero metric format of the first pipeline 200. In some embodiments, as is shown in FIGS. 7A and 7B the status form 704 is an example of a data stream monitor list that is updated as a part of step 318.

In a step 320 of the invalid zero value correction process 300, new raw data is updated to correct invalid zero values according to the updated data stream monitor list. Within the invalid zero value correction process 300, step 320 is part of a branch that split off at the determination of step 312. This branch is considered the affirmative branch and incorporates correcting of invalid zero values. Step 320 is in the affirmative branch along with steps 316 and 318.

Step 320 includes the intersection of traditional data gathering for data monitoring and the identification and verification of invalid zero values that occurred earlier in the invalid zero value correction process 300. The third pipeline 800 that is depicted in FIG. 8 provides details about the step 320. Stage 218 of the first pipeline 200 depicted in FIG. 2 overlaps with step 320.

In a step 322 of the invalid zero value correction process 300, a data monitor report is generated with non-zero values in place of invalid zero values. Those non-zero values are entered for those metrics for which the zero values were determined to be invalid. The corrected non-zero values may include non-numerical values. This substitution for the report helps to avoid misinterpretation of the data. In some instances, the corrected non-zero values may be or include null values. The null value may be a special marker used to indicate that a data value does not yet exist for this metric. The data monitor report may be generated and presented as a part of or after stage 220.

FIGS. 2 and 3 provide only illustrations of some embodiments and do not imply any limitations with regard to how different embodiments may be implemented. Many modifications to the depicted embodiment(s), e.g., to a depicted sequence or inclusion of steps, may be made based on design and implementation requirements.

FIG. 4 illustrates an operational flowchart illustrating an invalid zero candidate identification process 400 according to at least one embodiment and which is part of the invalid zero data correction process 300 depicted in FIG. 3. The invalid zero candidate identifying process 400 provides details about steps 306 and 308 from the invalid zero data correction process 300 depicted in FIG. 3 and about the stage 204 from the first pipeline 200 depicted in FIG. 2. The invalid zero candidate identification process 400 shown in FIG. 4 overlaps with the second pipeline 500, e.g., with the pipeline shown in FIG. 5. Specifically, FIG. 5 shows details about the substage 206 for candidate discover and the substage 208 for metric location which are part of the stage 204 from the first pipeline 200.

Due to the overlap of the invalid zero candidate identification process 400 and the second pipeline 500, the invalid zero candidate identification process 400 is described with cross-reference to the second pipeline 500, and the second pipeline 500 is described with cross-reference to the invalid zero candidate identification process 400.

In a step 402 of the invalid zero candidate identification process 400, the record type of the received raw data records is checked. These raw data records whose type is checked in step 402 may be those that were collected in step 302 and in the stage 202. This checking of step 402 may be performed via a type checker 504 which is a module of the substage 206 of the program of the invalid zero value correction 116 in the client computer 101. The record type for a record may be indicated by a header and/or indicator of that record. First received record 502 depicted in FIG. 5 shows an example of a record with a header/indicator flag and with other information presented as bits or values. The type checker 504 may read the header/indicator flag to determine the type of this first received record 502.

In a step 404 of the invalid zero candidate identification process 400, the records are divided into record pools based on the record type. The record type may be that record type determined in step 402. In some instances, the record type may be associated with a length of the record. Thus, records of a first size may be a first type, records of a second size may be a second type, etc. The second pipeline 500 in FIG. 5 shows an example that the collected raw data records are divided into various pools 506 based on the length of the particular record. FIG. 5 shows a total of n pools 506 for n different types of records based on the records having n different lengths amongst them. Each pool may constitute an allocated segment of memory. Records of the same type within a particular pool may be saved in the same piece of memory with an AND connector.

In a step 406 of the invalid zero candidate identification process 400, the respective piece of memory associated with each record is recorded. The program of the invalid zero value correction 116 in the client computer 101 may perform this recording in allocated memory of the client computer 101.

In a step 408 of the invalid zero candidate identification process 400, the records are split. This splitting of step 408 may be performed via a splitter 508 which is a module of the substage 206 of the program of the invalid zero value correction 116 in the client computer 101. The splitter 508 may perform the records splitting based on the metric mapping reference. One data record may include multiple metrics, so this step 408 helps separate the multiple metrics into individual metrics so that the metrics may be evaluated on an individual basis. The metric mapping reference may be considered as a dictionary of metric types that is provided by the system, the software, and/or the monitoring program.

In a step 410 of the invalid zero candidate identification process 400, the records are checked for zero values. This checking may occur in the module 510 for checking for zero value. The module 510 may be part of the substage 206 which is part of the program of the invalid zero value correction 116 in the client computer 101. A comparator of the program of the invalid zero value correction 116 in the client computer 101 or of the processing circuitry 120 of the client computer 101 may be used to read the data record values to identify those records that contain all zero values.

In a step 412 of the invalid zero candidate identification process 400, candidates for correction are identified based on the zero values. The checking that occurs in step 410 may reveal and/or identify those records that contain all zero values. Those records that contain all zero values are the candidates for invalid zero value correction. If those records with all zero values received their zero values based on metric initialization alone, then those zeroes are invalid zeroes. If those records with all zero values received their zero values based on true metric measurement, then those zeroes are true zero values. Distinguishing between these two groups has not yet occurred in step 412, so all records that contain all zero values at this point in step 412 are considered candidates to have invalid zero values.

In a step 414 of the invalid zero candidate identification process 400, the respective memory location is attached to the candidates. This memory location may be the memory location that was recorded in step 406. The metric locator module 514 in the second pipeline 500 may perform the attachment of step 414. The metric locator module 514 may be a module that is part of the substage 208 which is part of the program of the invalid zero value correction 116 in the client computer 101. In at least some embodiments, the various memory locations are typically offset from each other.

In a step 416 of the invalid zero candidate identification process 400, the candidates with their respective memory location are provided to the access bridge. This providing of step 416 may occur with the passing of the candidate information from one module within the program of the invalid zero value correction 116 in the client computer 101 to another module within the program of the invalid zero value correction 116 in the client computer 101. FIG. 2 showed the substage 212 for the access bridge as being part of the stage 210 for the metric check and as receiving the candidate information along with memory location in transmission 2 from the stage 204 and particularly from the substage 208 of the stage 204.

FIG. 5 illustrates a second pipeline 500 according to at least one embodiment and which corresponds to the invalid zero candidate identifying process 400 depicted in FIG. 4. FIG. depicts that the second pipeline 500 starts with a first received data record 502 being input to the substage 206 for candidate discover. The first received data record 502 is input into a type checker 504 of the substage 206. The type checker 504 may be a module of the substage 206 of the program of the invalid zero value correction 116 in the client computer 101. The type checker 504 may read a header and/or indicator of each received record, e.g., of the first received data record 502. The first received data record 502 shows an example of a record with a header/indicator flag and with other information presented as bits or values. The type checker 504 may read the header/indicator flag to determine the type of the respective record. Thus, the type checker 504 module may perform the step 402 of the invalid zero candidate identifying process 400. Different types of records may be written with different formats, so identifying the type of a record and then eventually grouping this record with other similar records may improve the flow and speed of the invalid zero value correction system.

In some instances, the record type may be associated with a length of the record. Thus, records of a first size may be a first type, records of a second size may be a second type, etc. The collected raw data records may be divided into various pools 506 based on the length of the particular record. FIG. 5 shows a total of n pools 506 for n different types of records based on the records having n different lengths amongst them. Each pool may constitute an allocated segment of memory. Records of the same type within a particular pool may be saved in the same piece of memory with an AND connector. The pools 506 may be disposed in persistent storage 113 that is allotted for the program for invalid zero value correction 116. The division into the pools 506 overlaps/occurs with the performance of step 404 in the invalid zero candidate identifying process 400 depicted in FIG. 4.

After the division into pools 506, the records are split via the splitter 508. The splitter 508 may be a module of the substage 206 (candidate discover) of the program of the invalid zero value correction 116 in the client computer 101. The splitter 508 may perform the records splitting based on the metric mapping reference. This splitter 508 may, therefore, perform step 408 of the invalid zero candidate identifying process 400 depicted in FIG. 4. One data record may include multiple metrics, so the splitter 508 helps separate the multiple metrics into individual metrics so that the metrics may be evaluated on an individual basis. The metric mapping reference may be considered as a dictionary of metric types that is provided by the system, the software, and/or the monitoring program.

After the splitting that occurs via splitter 508, the split records may be passed to the module 510 for checking for zero value. The module 510 may be part of the substage 206 (candidate discover) which is part of the program of the invalid zero value correction 116 in the client computer 101. The module 510 may invoke a comparator of the program of the invalid zero value correction 116 in the client computer 101 or of the processing circuitry 120 of the client computer 101 in order to read the data record values to identify those records that contain all zero values. Thus, the module 510 may perform the step 410 of the invalid zero candidate identifying process 400 depicted in FIG. 4. Those records that contain all zero values are the candidates for invalid zero value correction. If those records with all zero values received their zero values based on metric initialization alone, then those zeroes are invalid zeroes. If those records with all zero values received their zero values based on true metric measurement, then those zeroes are true zero values. Distinguishing between these two groups has not yet occurred in the module 510, so all records that contain all zero values at this point in the module 510 are considered candidates to have invalid zero values. This checking in module 510 results in the identification of candidates. Thus, the checking in module 510 may also perform step 412 of the invalid zero candidate identification process 400.

The candidates determined from the module 510 are passed into the substage 208 for metric locating and particularly to the metric locator module 514. The metric mapping reference module 512 provides information to both the splitter 508 and to the metric locator module 514. The metric mapping reference may be considered as a dictionary of metric types that is provided by the system, the software, and/or the monitoring program. The respective memory location is attached to the candidates. This memory location may be the memory location that was recorded previously for the particular data record. The metric locator module 514 may attach the memory location to the respective data record. In at least some embodiments, the various memory locations are typically offset from each other.

The metric locator module 514 may output in stage 516 invalid zero value candidates along with their respective location. Thus, the metric locator module 514 may perform the step 414 of the invalid zero candidate identification process 400. Additionally, stage 516 may overlap with the transmission 2 in the first pipeline 200, namely for the transmission 2 from the stage 204 and particularly from the substage 208 (metric locate) to the stage 210 and particularly to the substage 212 (access bridge). Thus, stage 516 also overlaps with step 416 of the invalid zero candidate identification process 400. The stage 516 may include the passing of the candidate information from one module within the program of the invalid zero value correction 116 in the client computer 101 to another module within the program of the invalid zero value correction 116 in the client computer 101.

FIGS. 4 and 5 provide only illustrations of some embodiments and do not imply any limitations with regard to how different embodiments may be implemented. Many modifications to the depicted embodiment(s), e.g., to a depicted sequence or inclusion of steps, may be made based on design and implementation requirements.

FIGS. 6A, 6B, and 6C provide details about some features that are part of finding the next record(s) in at least some embodiments. Therefore, FIGS. 6A, 6B, and 6C show details about step 308 of the invalid zero value correction process 300 that is depicted in FIG. 3. The next record is located in order to generate an access bridge for the next record. In at least some embodiments, not every record is accessed so sampling of some of the records is performed, e.g., checking one out of every four of the relevant records. The percentage of records that are printed and evaluated depends on the computing power of the computer system/data monitoring program.

FIG. 6A illustrates a first series 602 of fixed-length data records. With such fixed-length data records, multiple lengths may be used to locate the next record. A fixed-length blank 604 is shown in FIG. 6A. If n records have been observed before the blank, then the location of the blank may be determined by multiplying the record standard length L times the number of records n.

FIG. 6B illustrates another embodiment that includes a second series 606 of dynamic-length data records. For such dynamic-length records, namely for a series with individual records that have different lengths than other records of the same series, the next record may be determined via a linkage from the previous record in the memory to find the next record address. Thus, the location of the dynamic length blank 608 may be determined by reading the linkage of the immediately preceding record, which in this example shown in FIG. 6B is the record n.

FIG. 6C illustrates the marking of invalid zero value candidates and their memory locations according to at least one embodiment. FIG. 6C shows an enlargement 610 of a third blank 612. FIG. 6C shows that a first candidate 614a and its location (including Bit $t_1$) is marked, that a second candidate 614b and its location (including Bit $t_2$) is marked, and that a third candidate 614c and its location (including Bit $t_3$) is also marked in the third blank 612. With the candidates and their locations marked, these records are suitable for inputting to the substage 212 for access bridge establishment. The location may include an address of a starting bit for a particular data record to be checked.

FIG. 7A illustrates aspects of establishing preemption access in accordance with at least one embodiment and as part of the invalid zero correction process 300 depicted in FIG. 3 and as part of the first pipeline 200 depicted in FIG. 2. FIG. 7A provides details about the substage 212 for establishing an access bridge to interact with the client memory piece 216. FIG. 7A shows that the substage 212 for access bridge establishment includes a bridge builder module 708. Using the memory location that was identified for a metric, the bridge builder module 708 generates an access connection to the bit of candidate metric in the incoming record of memory. FIG. 7A shows the bridge builder module 708 as generating and/or establishing three different access bridges, namely a first access bridge 710a, a second access bridge 710b, and a third access bridge 710c. These three access bridges are generated for the records $t_1$, $t_2$, and $t_3$, respectively. The first access bridge is an access connection to a first memory location 712a within the client memory piece 216. The second access bridge is an access connection to a second memory location 712b within the client memory piece 216. The third access bridge is an access connection to a third memory location 712c within the client memory piece 216. The records $t_1$, $t_2$, and $t_3$ represent three different metrics that are stored in different memory locations within the client memory piece 216 in response to the client performing computing operations. FIG. 7A shows that the first memory location 712a is for Bit $t_1$, that the second memory location 712b is for Bit $t_2$, and that the third memory location 712c is for Bit $t_3$. The first access bridge 710a, a second access bridge 710b, and a third access bridge 710c are established at a first time. The establishment of these three bridges may in some instances be simultaneous and in other instances may be staggered. Each access bridge may be long but in a lowest priority or security key which allows easy seizing by other write access.

FIG. 7A shows that the bridge builder has generated a status form 704 which constitutes a list of the invalid zero value candidates that have been identified earlier in the invalid zero value correction process 300. The status form 704 may be a binary string and/or an example of the data stream monitor list referred to in step 318 of the invalid zero value correction process 300. The status form 704 may contain a value for each entry that represents a candidate. The entry indicates the results of the invalid zero value determination. In some embodiments and as depicted in FIG. 7A, this value may be a binary value. FIG. 7A depicts a first binary value 706a. FIG. 7A depicts that the value for the three candidates are each zero in order to indicate that these candidates have at this stage not been confirmed or excluded.

FIG. 7B shows a state of the invalid zero value correction process 300 at a second time that is subsequent to the first time when each of the first access bridge 710a, the second access bridge 710b, and the third access bridge 710c had been established. The second time may be after some cycles have occurred. FIG. 7B shows that checks were made for each of the first access bridge 710a, the second access bridge 710b, and the third access bridge 710c and that the access bridges were broken for the second and third access bridges 710b and 710c. Thus, FIG. 7B shows that the first access bridge 710a is still alive/maintained and valid, that the second access bridge 710a has been broken to become a first broken bridge 714a, and that the third access bridge 710c has been broken to become a second broken bridge 714b. The status may be determined via response received to a respective transmission to the particular memory location within the client memory piece 216.

This maintaining of the first access bridge 710a indicates that the client operations have not been writing to and/or updating this first memory location 712a. The preemption that was built in for the data monitor program to preempt the programs of the client from taking access to this memory location is still being accepted. A lack of any client activity to this first memory location 712a indicates that values are not being tracked and that the provided zero values are invalid. These provided zero values were program-generated substitutes for otherwise uninitialized values.

However, the respective memory location, namely the second memory location 712b and the third memory location 712c, respectively, being inaccessible for the second bridge 710b and for the third bridge 710c indicates that the access connection is broken. The client programs connected to the memory location with a higher priority level and/or security key than was used for establishing the access bridge. The client programs have seized the memory location for write access. Thus, the client activity is interpreted as indicating that zero values are correct for the respective metric. These zero values are not generated due to program initialization from a null value, but instead represent that zero is a correct measurement for these particular metrics being stored at the second memory location 712b and at the third memory location 712c.

FIG. 7B illustrates aspects of the substage 214 from the first pipeline 200 depicted in FIG. 2. The substage 214 is for preemption accept which refers to the preemption of the access bridge via the data monitor program preempting the client programs from using the particular memory location. If the preemption is still accepted at a second time, then the corresponding invalid zero value candidate is determined as holding invalid zero values that need correction.

FIG. 7B shows that in response to the preemption accept check, the value bits for the second bridge and for the first bridge in the status form 704 are maintained as "zero" but the first entry includes a first changed value bit 706b as "1". This change and/or reset to "1" while the other bits are still "0" indicates for this embodiment that the first entry holds invalid zero values while the other entries hold valid zero values. Thus, in the depicted embodiment the second and third entries are excluded from needing correction of the zero values.

In other embodiments, the excluded entries may have their binary values changed, e.g., from zero to one, while the binary values for the entries confirmed as having invalid zeroes remain the same, e.g., stay at zero.

A binary value indication for the status form 704 may reduce the amount of memory required to track the invalid zero value candidates.

FIG. 8 illustrates a third pipeline 800 for correcting invalid zero values for data reports in accordance with at least one embodiment. The third pipeline 800 includes details about the stages 218 and 220 of the first pipeline 200 that is shown in FIG. 2. FIG. 8 includes stage 202 that is shown in the first pipeline 200 in FIG. 2. The stage 202 includes the collection of raw data records. This raw data may be from data streams that are being monitored. The data streams may be generated via one or more programs being operated by a client, e.g., at the client computer 101 that is depicted in FIG. 1. The client computer 101 may receive data from other computers in a network of the client and/or may perform operations and/or calculations for client programs which generate the raw data.

FIG. 8 shows that the status form 704 in its updated form from FIG. 7B is used to correct new data that is received. Using the status form 704, any invalid metric of each record type may be identified. The stage 804 for invalid metrics in record types in the third pipeline 800 overlaps in meaning with the various pools 506 for records types that was depicted in the second pipeline 500 shown in FIG. 5 and was described previously. The status form 704 in its updated state may be sent to the stage 804 to identify those records with invalid zero values. Thus, the identified records are input into the metric formatter module 802 which updates the invalid zero values to special value. The metric formatter module 802 changes the invalid zero values to a non-zero value. e.g., to a non-numerical value such as null. In some instances, the changed value may in an automated manner be selected from a pre-established list generated by a data monitor.

The metric formatter module 802 then sends the changed data to the stage 220 of output data for report. This stage 220 is in at least some embodiments followed by stage 806 for generating a report and presenting the report. The report will include corrected values in place of the invalid zero values. The report may be presented via a computer such as via the UI device set 123 of the client computer 101 and/or may be transmitted across the WAN 102 for presentation via the remote server 104, the private cloud 106, and/or via an end user device 103 which is being operated by a data monitor who helps manage the program for invalid zero value correction 116.

The metric formatter module 802 may be implemented in simple memory operations in a manner that incurs few system resources and operates quickly.

In one embodiment, a special value of x'FF' is selected as a special value for a metric with invalid zero values. A piece of memory is applied with the same length as the record which contains the invalid metric. All of the invalid metric bits are changed to be x'FF' instead of "0". The other bits are left to be x'00'. The 'AND' connector is used between the memory and the raw data record. The result is placed into the collected memory. When the metric formatter module 802 encounters x'FF' the metric formatter module 802 replaces the x'FF' with "null" for the generated data report.

FIGS. 6A, 6B, 6C, 7A, 7B, and 8 provide only illustrations of some embodiments and do not imply any limitations with regard to how different embodiments may be implemented. Many modifications to the depicted embodiment(s), e.g., to a depicted sequence or inclusion of steps, may be made based on design and implementation requirements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data monitoring management, the method comprising:
    receiving, via a computer, a first invalid zero value candidate from a data stream;
    receiving, via the computer, a memory location for the first invalid zero value candidate;
    establishing, via the computer, at a first time an access connection to the memory location;
    checking, via the computer, at a second time subsequent to the first time the access connection to the memory location; and
    determining, via the computer, whether the first invalid zero value candidate contains an invalid zero value based on the checking.

2. The method of claim 1, wherein the checking indicates that the access connection is broken such that the first invalid zero value candidate is determined to not contain an invalid zero value.

3. The method of claim 2, wherein the access connection is broken via memory writes to the memory location.

4. The method of claim 1, wherein the checking indicates that the access connection is maintained such that the first invalid zero value candidate is determined to contain an invalid zero value.

5. The method of claim 4, further comprising:
    updating a data stream monitor list to indicate that the first invalid zero value candidate needs a value reset to not be zero.

6. The method of claim 4, further comprising:
    in response to the determination that the first invalid zero value candidate contains the invalid zero value, updating a new data portion, corresponding to the first invalid zero value candidate, to have a null value instead of a zero value.

7. The method of claim 1, further comprising:
    identifying the first invalid zero value candidate by finding in the data stream a first data segment filled with zeroes.

8. The method of claim 1, further comprising:
    pooling raw data records from the data stream based on a respective flag of the raw data records.

9. A computer system for data monitoring management, the computer system comprising:
    one or more processors, one or more computer-readable memories, and program instructions stored on at least one of the one or more computer-readable memories for execution by at least one of the one or more processors to cause the computer system to:
    receive a first invalid zero value candidate from a data stream;
    receive a memory location for the first invalid zero value candidate;
    establish at a first time an access connection to the memory location;
    check at a second time subsequent to the first time the access connection to the memory location; and
    determine whether the first invalid zero value candidate contains an invalid zero value based on the checking.

10. The computer system of claim 9, wherein the checking indicates that the access connection is broken such that the first invalid zero value candidate is determined to not contain an invalid zero value.

11. The computer system of claim 10, wherein the access connection is broken via memory writes to the memory location.

12. The computer system of claim 9, wherein the checking indicates that the access connection is maintained such that the first invalid zero value candidate is determined to contain an invalid zero value.

13. The computer system of claim 12, wherein the program instructions are further for execution to cause the computer system to:
    update a data stream monitor list to indicate that the first invalid zero value candidate needs a value reset to not be zero.

14. The computer system of claim 12, wherein the program instructions are further for execution to cause the computer system to:
    in response to the determination that the first invalid zero value candidate contains the invalid zero value, update a new data portion, corresponding to the first invalid zero value candidate, to have a null value instead of a zero value.

15. The computer system of claim 9, wherein the program instructions are further for execution to cause the computer system to:
    identify the first invalid zero value candidate by finding in the data stream a first data segment filled with zeroes.

16. The computer system of claim 9, wherein the program instructions are further for execution to cause the computer system to:
    pool raw data records from the data stream based on a respective flag of the raw data records.

17. A computer program product for data monitoring management, the computer program product comprising a computer-readable storage medium having program instructions embodied therewith, the program instructions executable by a computer to cause the computer to:
    receive a first invalid zero value candidate from a data stream;
    receive a memory location for the first invalid zero value candidate;
    establish at a first time an access connection to the memory location;
    check at a second time subsequent to the first time the access connection to the memory location; and
    determine whether the first invalid zero value candidate contains an invalid zero value based on the checking.

18. The computer program product of claim 17, wherein the checking indicates that the access connection is broken such that the first invalid zero value candidate is determined to not contain an invalid zero value.

19. The computer program product of claim 18, wherein the access connection is broken via memory writes to the memory location.

20. The computer program product of claim 17, wherein the checking indicates that the access connection is maintained such that the first invalid zero value candidate is determined to contain an invalid zero value.

* * * * *